(12) United States Patent
Duivenvoorden

(10) Patent No.: US 7,821,445 B2
(45) Date of Patent: Oct. 26, 2010

(54) RADAR LEVEL GAUGE

(75) Inventor: Jos Duivenvoorden, Trent River (CA)

(73) Assignee: Siemens Milltronics Process Instruments, Inc., Peterborough (CA)

( * ) Notice: Subject to any disclaimer, the term of this patent is extended or adjusted under 35 U.S.C. 154(b) by 0 days.

(21) Appl. No.: 12/220,868

(22) Filed: Jul. 29, 2008

(65) Prior Publication Data

US 2009/0033544 A1 Feb. 5, 2009

(30) Foreign Application Priority Data

Jul. 31, 2007 (EP) .................................. 07015039

(51) Int. Cl.
*G01S 13/08* (2006.01)
(52) U.S. Cl. ...................................... 342/124
(58) Field of Classification Search ................. 342/124; 367/908
See application file for complete search history.

(56) References Cited

U.S. PATENT DOCUMENTS 6,950,055 B2 9/2005 Edvardsson et al.

2003/0030517 A1 2/2003 Munley et al.
2005/0083229 A1 4/2005 Edvardsson et al.
2007/0028829 A1 2/2007 Griessbaum et al.
2007/0188396 A1* 8/2007 Griessbaum et al. ........ 343/786

FOREIGN PATENT DOCUMENTS

| DE | 100 28 864 A1 | 12/2001 |
| DE | 100 60 069 C1 | 4/2002 |
| WO | WO 2007/017137 A2 | 2/2007 |

* cited by examiner

*Primary Examiner*—Ian J Lobo

(57) ABSTRACT

A radar level gauge for measuring a level of a surface of a product in a container has an antenna for transmitting microwaves to the surface and receiving microwaves reflected by the surface, a measurement circuitry for generating said microwaves to be transmitted and for evaluating said received microwaves, a hollow waveguide between the antenna and the measurement circuitry, said waveguide being separated by a gap into a first waveguide member coupled to the antenna and a second waveguide member coupled to the measurement circuitry, and a dielectric barrier arranged in said gap. A dielectric barrier which is simpler in construction and less critical with respect to the wavelength of the microwaves is obtained in that the dielectric barrier comprises a shaft member inserted into the hollow waveguide and extending through at least a portion of the first waveguide member, through the gap and through at least a portion of the second waveguide member.

18 Claims, 1 Drawing Sheet

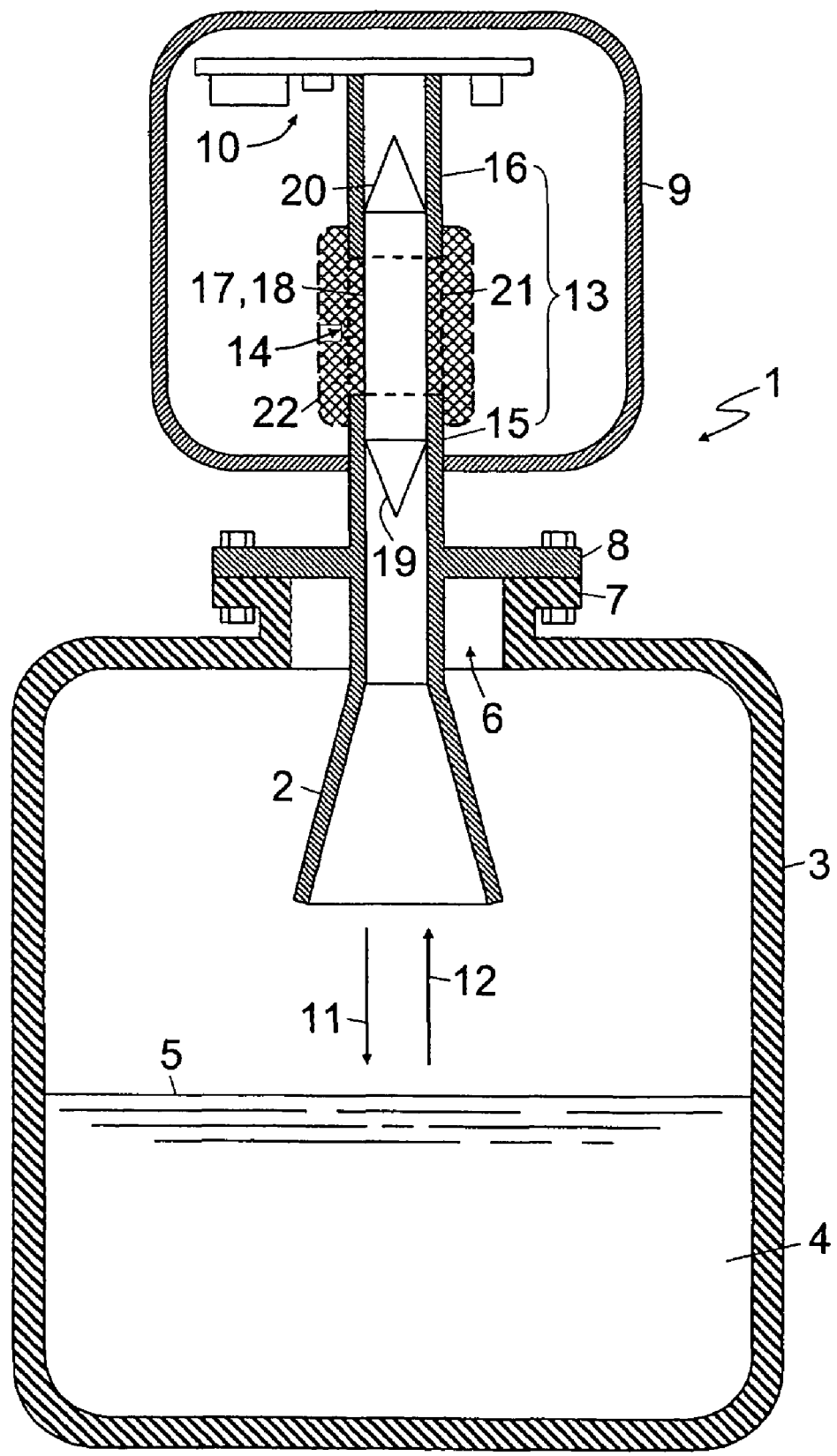

RADAR LEVEL GAUGE

CROSS REFERENCE TO RELATED APPLICATIONS

This application claims priority of European Patent Office application No. 07015039.6 EP filed Jul. 31, 2007, which is incorporated by reference herein in its entirety.

FIELD OF INVENTION

The present invention relates to a radar level gauge for measuring a level of a surface of a product in a container, comprising an antenna for transmitting microwaves to the surface and receiving microwaves reflected by the surface, a measurement circuitry for generating said microwaves to be transmitted and for evaluating said received microwaves, a hollow waveguide between the antenna and the measurement circuitry, said waveguide being separated by a gap into a first waveguide member coupled to the antenna and a second waveguide member coupled to the measurement circuitry, and a dielectric barrier arranged in said gap.

BACKGROUND OF INVENTION

In such a radar level gauge known from U.S. Pat. No. 6,950,055 (see there FIGS. 6 and 11), the dielectric barrier comprises a thin insulating layer which non-conductively separates said first and second waveguide members. Correspondingly, the width of the gap between the waveguide members is equal to the thickness of the layer. As the insulating layer serves as a dielectric window, its optimal thickness corresponds approximately to a half wavelength of the microwaves. The U.S. Pat. No. 6,950,055 states a thickness of e.g. 0.5 mm and that the design around the insulating layer must be well designed in order to avoid disturbances in the microwave function. As the insulating layer is normally too thin to mechanically seal against the measuring environment the antenna is directed to, an additional sealing in form of a shaft member can be inserted into the first waveguide member leading to the antenna (FIG. 10 of U.S. Pat. No. 6,950,055).

SUMMARY OF INVENTION

It is therefore an object of the invention to provide for a radar level gauge a dielectric barrier which is simpler in construction and less critical with respect to the wavelength of the microwaves.

According to the invention this object is achieved in that the dielectric barrier comprises a shaft member inserted into the hollow waveguide and extending through at least a portion of the first waveguide member, through the gap and through at least a portion of the second waveguide member.

The dielectric shaft member guides the microwaves out from the one of the waveguide members through the gap into the other one of the waveguide members. Therefore, the width of the gap is not bound to the wavelength of the microwaves. The gap width can be wider than that of the above-mentioned known level gauge, thus increasing the dielectric strength of the gap.

For grounding the whole level gauge to e.g. a tank on which the level gauge is installed, the first waveguide member is electrically connected to an at least partially electrically conductive enclosure containing said second waveguide member and said measurement circuitry. The measurement circuitry is then, by the gap, isolated from the potential of the tank.

For impedance matching with the respective waveguide members, the shaft member preferably comprises at least one of its end regions a transition section situated in the respective waveguide member. The transition section can be realized by introducing a dielectric constant gradient into the material of the shaft member and/or preferably tapering the shaft member towards its end.

To minimize losses in the microwave transmission, the gap may be further filled with a dielectric material from the peripheral surface of the shaft member up to the peripheral surface of the hollow waveguide. This dielectric material may be different from or the same as that of the shaft member, wherein in the latter case the shaft member may comprise a shoulder portion filling the gap up to the peripheral surface of the hollow waveguide. Furthermore, portions of the first and second waveguide members, on both sides of the gap may be surrounded by a dielectric sleeve member bridging the gap.

BRIEF DESCRIPTION OF THE DRAWING

The invention will be now described with reference to the single FIGURE which schematically shows an embodiment of the radar level gauge according to the invention.

DETAILED DESCRIPTION OF INVENTION

The FIGURE shows a radar level gauge 1 with a horn antenna 2. The radar level gauge 1 is mounted on top of a container, tank or vessel 3 which holds a material 4, such as liquid, slurry or solid, with a level determined by the top surface 5 of the material 4. The vessel 3 has an opening 6 with a flange 7 to which the radar level gauge 1 is secured using a clamping or mounting ring 8 or any other suitable fastening means. The radar level gauge 1 comprises an enclosure 9 which holds an electrical/electronic measurement circuitry 10 for generating microwaves 11 to be transmitted by the antenna 2 and for evaluating microwaves 12 reflected by the surface 5 and then received by the antenna 2. Such circuitry is well known in the art and need not be described further. The microwaves 11, 12 are transmitted between the measurement circuitry 10 and the antenna 2 by a hollow waveguide 13 which is non-conductively separated by a gap 14 into a first waveguide member 15 coupled to the antenna 2 and a second waveguide member 16 coupled to the measurement circuitry 10. Coupling of a hollow waveguide to an electronic circuitry is also well known and need not be described in detail. The first waveguide member 15 leads from the outside into the enclosure 9 so that second waveguide member 16 and the gap 14 are situated within the enclosure 9. The first waveguide member 15 is furthermore electrically connected to the enclosure 9 which is at least partially of electrically conductive material.

A dielectric barrier 17 is arranged in the gap 14 between the first and second waveguide members 15, 16 and comprises a shaft member 18 which is inserted into the hollow waveguide 13 and extends through a portion of the first waveguide member 15, through the gap 14 and through a portion of the second waveguide member 16. The shaft member 18 is conically tapered at each of its end regions thus forming there transition sections 19, 20 for impedance matching with the respective waveguide member 15, 16. To minimize losses in the microwave transmission, the gap 14 may be further filled with a dielectric material 21 from the peripheral surface of the shaft member 18 up to the peripheral surface of the hollow waveguide 13. This dielectric material 21 may be the same as that of the shaft member 18, wherein in this case the shaft member 18 may comprise a shoulder portion filling the gap 14 up to the peripheral surface of the hollow waveguide 13. Preferably, the dielectric material 21 has a higher dielectric constant than the shaft member 18. Furthermore, portions of the first and second waveguide members 15, 16 on both sides of the gap 14 may be surrounded by a dielectric sleeve member 22 of said dielectric material 21.

The invention claimed is:

1. A radar level gauge for measuring a level of a surface of a product in a container, comprising:
   an antenna for transmitting microwaves to the surface and receiving microwaves reflected by the surface;
   a measurement circuitry for generating said microwaves to be transmitted and for evaluating said received microwaves;
   a hollow waveguide between the antenna and the measurement circuitry, said waveguide being separated by a gap into a first waveguide member coupled to the antenna and a second waveguide member coupled to the measurement circuitry;
   a dielectric barrier arranged in said gap, and
   a shaft member inserted into the hollow waveguide and extending through at least a portion of the first waveguide member and through at least a portion of the second waveguide member,
   wherein the dielectric barrier comprises the shaft member, the shaft member extending through the gap so as to guide the microwaves out from the one of the waveguide members through the gap into the other one of the waveguide members.

2. The radar level gauge as claimed in claim 1, wherein the first waveguide member is electrically connected to an at least partially electrically conductive enclosure containing said second waveguide member and said measurement circuitry.

3. The radar level gauge as claimed in claim 1, wherein the shaft member has at at least one of its end regions a transition section situated in the respective waveguide member.

4. The radar level gauge as claimed in claim 2, wherein the shaft member has at at least one of its end regions a transition section situated in the respective waveguide member.

5. The radar level gauge as claimed in claim 3, wherein, in the transition section, the shaft member is tapered towards its end.

6. The radar level gauge as claimed in claim 4, wherein, in the transition section, the shaft member is tapered towards its end.

7. The radar level gauge as claimed in claim 1, wherein the shaft member has a shoulder portion filling the gap up to the peripheral surface of the hollow waveguide.

8. The radar level gauge as claimed in claim 2, wherein the shaft member has a shoulder portion filling the gap up to the peripheral surface of the hollow waveguide.

9. The radar level gauge as claimed in claim 3, wherein the shaft member has a shoulder portion filling the gap up to the peripheral surface of the hollow waveguide.

10. The radar level gauge as claimed in claim 4, wherein the shaft member has a shoulder portion filling the gap up to the peripheral surface of the hollow waveguide.

11. The radar level gauge as claimed in claim 5, wherein the shaft member has a shoulder portion filling the gap up to the peripheral surface of the hollow waveguide.

12. The radar level gauge as claimed in claim 6, wherein the shaft member has a shoulder portion filling the gap up to the peripheral surface of the hollow waveguide.

13. The radar level gauge as claimed in claim 1, wherein the gap is filled with a dielectric material in a thickness which extends from the peripheral surface of the shaft member up to the peripheral surface of the hollow waveguide.

14. The radar level gauge as claimed in claim 2, wherein the gap is filled with a dielectric material in a thickness which extends from the peripheral surface of the shaft member up to the peripheral surface of the hollow waveguide.

15. The radar level gauge as claimed in claim 3, wherein the gap is filled with a dielectric material in a thickness which extends from the peripheral surface of the shaft member up to the peripheral surface of the hollow waveguide.

16. The radar level gauge as claimed in claim 4, wherein the gap is filled with a dielectric material in a thickness which extends from the peripheral surface of the shaft member up to the peripheral surface of the hollow waveguide.

17. The radar level gauge as claimed in claim 7, wherein portions of the first and second waveguide members on both sides of the gap are surrounded by a dielectric sleeve member bridging the gap.

18. The radar level gauge as claimed in claim 13, wherein portions of the first and second waveguide members on both sides of the gap are surrounded by a dielectric sleeve member bridging the gap.

* * * * *